Aug. 6, 1957 E. J. BRUNNIER 2,801,662
APPARATUS FOR TRIMMING VEGETABLES AND THE LIKE
Filed Aug. 18, 1955 2 Sheets-Sheet 2
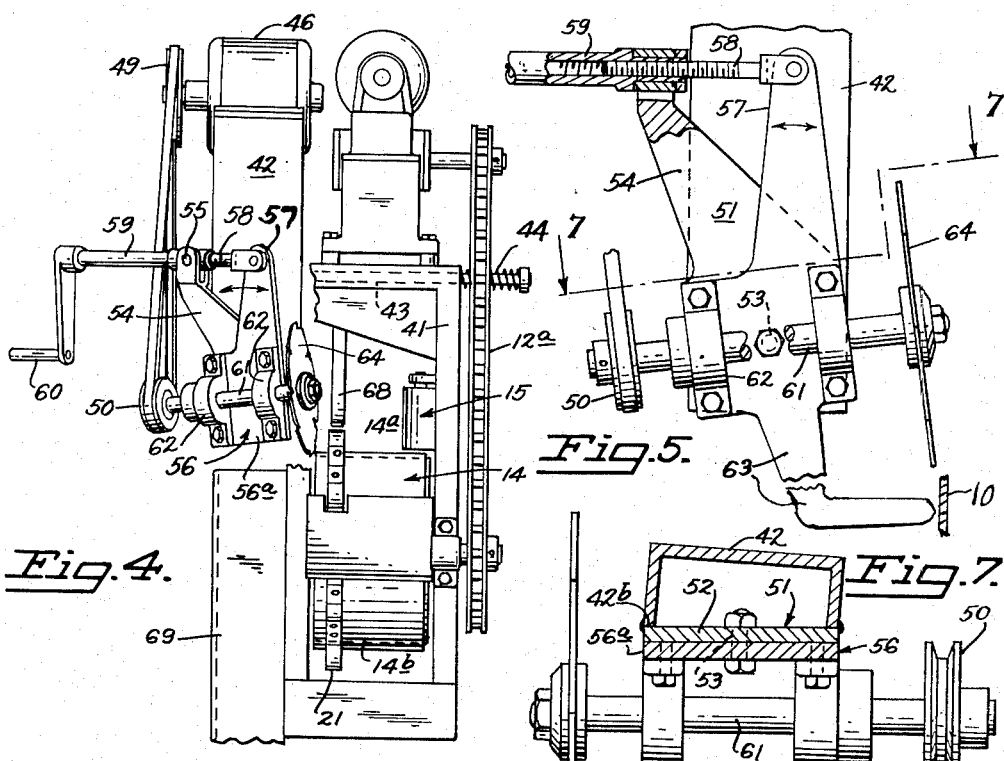
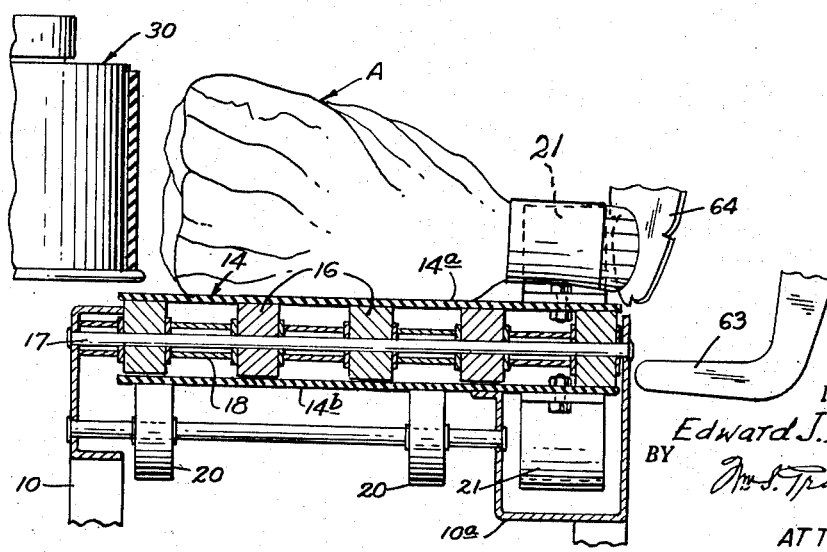
INVENTOR.
Edward J. Brunnier
BY
ATTORNEY United States Patent Office 2,801,662
Patented Aug. 6, 1957

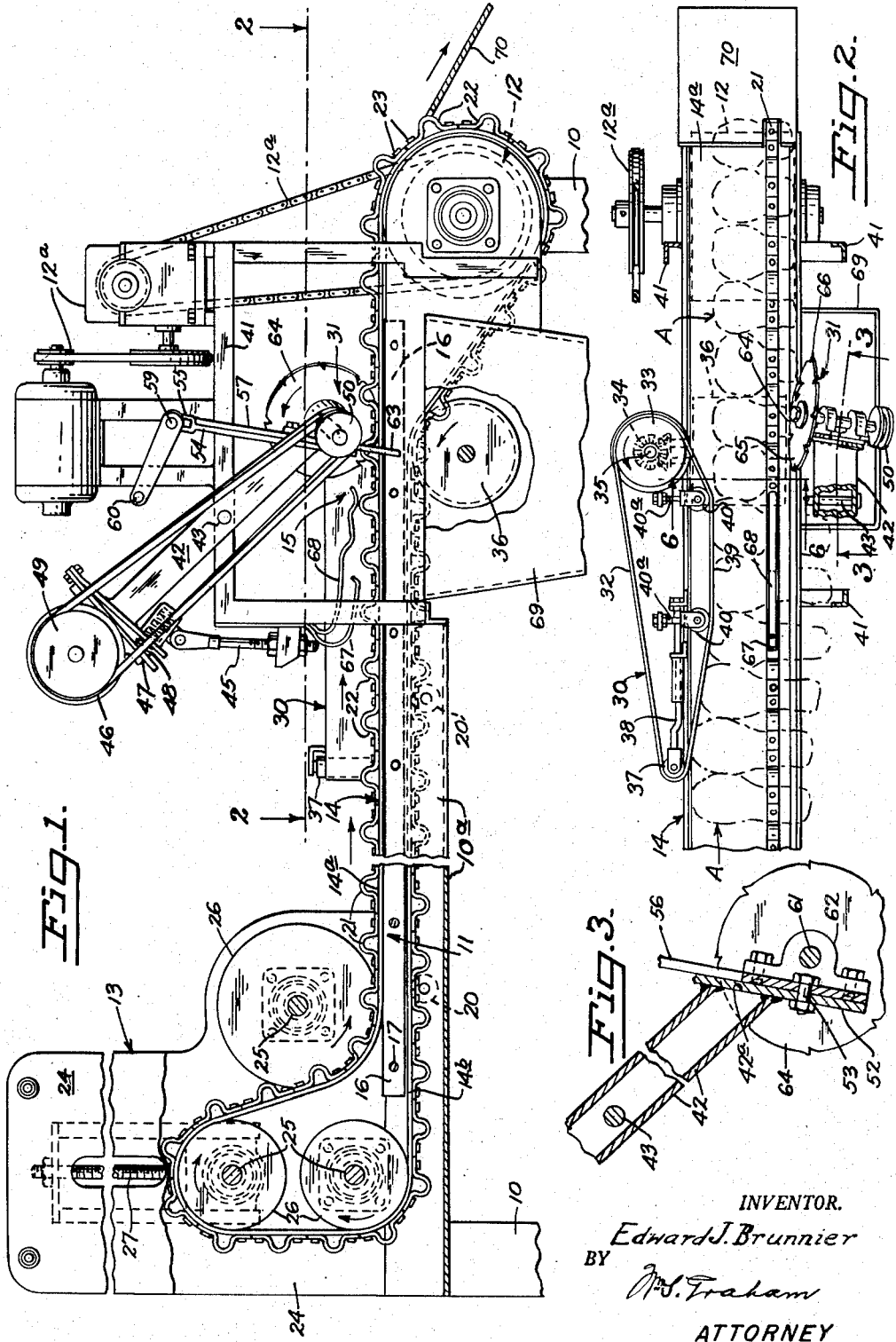

2,801,662

APPARATUS FOR TRIMMING VEGETABLES AND THE LIKE

Edward J. Brunnier, Salinas, Calif., assignor to D'Arrigo Bros. Co. of California, San Jose, Calif., a corporation of California Application August 18, 1955, Serial No. 529,103

14 Claims. (Cl. 146—82)

This invention relates to apparatus for trimming vegetables and the like to a predetermined length, and relates more particularly to such apparatus having conveyor means and means to position such products in the path of a cutting blade or saw for such shearing.

There are many vegetables in the marketing of which it is desirable to shear away a portion of surplus stem or root or leafy growth so as to provide a uniform length of the product. This is particularly desirable if the vegetables are to be packed for shipment in containers since it provides uniformity of length relative to the packaging space, and it is more especially desirable with vegetables which are commonly sold in bound bunches formed of a plurality of stalks or units such as broccoli, celery, spring onions, Swiss chard and the like. Some of these vegetables, such as bunches of broccoli, have a much larger head than stalks, which gives an angular tilt or incline to the axis of the bunch when they are placed on a surface for severance of the stems, wherefore means are desirable for shearing the stems perpendicular to such axis. Some of such vegetables have head structures which are easily broken and which, if damaged, detracts from both appearance and price, and it is desirable to process the stalks or bunches with care, insuring severing of the bunches to a uniform length, and expediting the handling thereof due to the possibility of wilting between the time of actual field harvesting and refrigerated shipment. It is the object of this invention to meet these problems in the shearing of the waste or undesired portions of the vegetable products.

Briefly, the invention comprises an endless loop carrier belt having cups or pockets thereon adjacent one edge into which the bunches or stalks of vegetables may be placed and conveyed past a shearing means such as a rotary knife blade which, because it preferably has teeth, may be herein designated as a rotary saw, the blade of which is set to rotate closely adjacent to the edge of the conveyor belt and the pockets thereon, the saw being mounted for rotation on the axis of a shaft which may be tilted adjustably to compensate for the angle of incline of the axis of the bunched vegetables, means being provided longitudinally of the opposite edge of the carrier belt for aligning one end of the vegetables and crowding them transversely of the carrier belt towards the saw so that the saw will cut the opposite ends of the stalk or bunches to a uniform length, the last mentioned means being preferably synchronized with the movement of the carrier belt.

Since bunched stalks of broccoli afford a suitable example for utilizing the invention, such product is employed herein for descriptive purposes.

A preferred form in which the invention may be exemplified is described herein and illustrated in the accompanying drawings which are herein referred to and made a part hereof.

In the drawings:

Fig. 1 is a longitudinal side elevation of the invention partly broken away and partly in section;

Fig. 2 is a fragmentary plan view longitudinally of a portion of apparatus on line 2—2 of Fig. 1;

Fig. 3 is an enlarged fragmentary view partly in section on line 3—3 of Fig. 2;

Fig. 4 is a fragmentary elevational end view at the trimming and discharge end of the apparatus;

Fig. 5 is a fragmentary enlarged view of saw-tilting mechanism;

Fig. 6 is a fragmentary enlarged transverse sectional view on line 6—6 of Fig. 2;

Fig. 7 is a fragmentary sectional view on line 7—7 of Fig. 5.

Referring to the drawings in which like reference characters indicate corresponding parts in the several views, 10 indicates any suitable supporting frame having an underhung guard channel 10a longitudinally of one side thereof. Upon the frame is mounted an elongated belt track generally indicated 11 at one end of which is belt-drive roller mechanism 12 driven by motor, reducing gears and pulley belt collectively indicated 12a. At the opposite end of the conveyor belt is a return and take-up roller mechanism 13, an elongated driven endless loop conveyor belt 14 being mounted around said drive and return rollers. The conveyor face 14a of the conveyor belt is supported for sliding movement on the belt track 11. Adjacent to one end of the belt and preferably at the end having the drive roller 12, is mechanism collectively and generally indicated 15 for crowding the product toward a shearing means for cutting or shearing that portion which is to be cut off, which in bunched broccoli, would be the surplus extended stem portion.

The belt track 11 which is supported on frame 10, comprises a plurality of longitudinally parallel spaced strips 16 tied into the frame by cross bars 17 and relatively spaced thereon by spacer members 18, the spacing of strips 16 reducing the friction area of the sliding belt 14. The return flight 14b of the belt is supported by rollers 20. At its conveyor face 14a, the conveyor belt 14 has adjacent one edge portion which overlies the channel 10a a continuously aligned corrugated strip consisting of a plurality of cups or pockets 21, open at the top and secured to the belt at the valleys 22 by rivets or bolts 23.

The take-up and return mechanism 13 comprises relatively spaced vertical supporting plates 24 between which extend a plurality, preferably three, shafts 25 each having a rotatable roller 26 thereon, one of which is adjustable by a threaded jack screw 27 as a take-up means, the adjustable roller being to shorten or lengthen the belt, the other two rollers being idlers to align the respective conveyor and return flights of the belt.

The crowding and shearing mechanism collectively indicated 15 are substantially opposed relatively and are, respectively, at opposite sides of the upper or conveyor flight 14a of the belt 14, and may logically be divided into two components, the first being an aligning and crowding means 30 and the second being a saw-arm unit or shearing means 31, the effective operation of the crowding means being preferably closely adjacent to a position of the belt which is immediately prior to the processed product reaching the shearing means by movement on the conveyor belt.

The aligning and crowding means 30 is at the edge of the belt which is opposite the shearing means and the pockets 21. It comprises a continuous endless loop crowder belt 32 of substantial width to superficially engage the adjacent end face of the processed product on the belt, such as the end face of the head of a bunch of broccoli if that is the particular product being processed. The plane of the crowder belt is substantially normal or vertically perpendicular to the upper conveyor face 14a of the conveyor belt 14, being driven by a roller 33 at one of its ends, through bevel gears 34 and a shaft 35 which in turn is rotated by a roller 36 underlying and contacting the return flight 14b of the conveyor belt 14, whereby the speed of the crowding belt may be relatively synchronized with the conveyor belt, said timing being selectively changed, if desired, by varying the size of the roller 36 or the ratio of the bevelled gears 34. The opposite end of the loop of the crowder belt passes around a relatively smaller roller 37, said opposite ends of the crowder belt being mounted substantially at the adjacent outer edge of the conveyor flight 14a of conveyor belt 14, the smaller roller 37 being mounted at the end of an adjustable rod 38 whereby the longitudinal tensioning of the crowder belt may be accomplished. Between its ends the loop of the crowder belt has a crowder flight 39 the path of which moves inwardly to vertically overlie the conveyor flight 14a of the conveyor belt and is adjustably maintained at that inward overlying position by a pair of longitudinally spaced idler rollers 40 which also are mounted adjustably on threaded pins 40a whereby the rollers 40 and the crowding flight 39 of the crowder belt may be moved inwardly and outwardly, the purpose of such adjustability being to properly space the broccoli or commodity on the conveyor belt 14 with relation to the shearing mechanism 31.

The saw-arm unit of the shearing or cutting mechanism 31 is mounted on any suitable supporting frame 41 which is elevated and overlies the conveyor belt at the end portion adjacent to the crowding belt 30 and drive roller 12. This frame may also serve to support other mechanism such as the drive motor and gear box 12a of the driver roller 12 as well as the rollers and adjustment means for the crowding belt 32.

On the frame 41 at the side thereof opposite the crowder belt and corresponding to the side of the conveyor belt having the cups 21, there is a knife or saw support arm 42 preferably vertically angularly inclined relative to the frame and upwardly relative to the conveyor belt. The saw-arm is pivotally mounted at a central portion on one end of a supporting shaft 43 at a position elevated above the conveyor belt, the supporting shaft having a tensioned coil spring 44 to maintain the arm firmly but pivotally against the frame, the arm being adjustably secured at a desired position by a jack screw 45. At its upper end the saw-arm 42 carries a drive motor 46 mounted on a spring seat 47 cushioned by coil spring 48, the shaft of said motor having a sheave 49 providing a drive through a suitable belt for a driving pulley 50, for a knife cutting blade or saw to be further described. At its opposite or lower end the saw-arm terminates in an end face characterized by a compound bias having an incline both in the vertical plane as 42a in Fig. 3 and in the horizontal plane as at 42b in Fig. 7. Conforming to said biased end there is fixedly mounted by welding at said end a bracket plate 51, the fixed lower end portion thereof being a flat pivot plate 52 having a pivot pin 53 therethrough. The bracket plate 51 has an upwardly extended clevis supporting arm 54 at the free end of which is a bifurcated clevis yoke for a bearing 55.

In co-planar slidable facial contact with the pivot plate 52 there is pivotally mounted on pivot pin 53 a saw-adjustment plate 56 which has a saw-platform portion 56a mounted on the pivot pin and extends upwardly to provide an integral lever arm 57, the free terminal end of which has hingedly connected thereto a threaded adjustment rod 58 threadedly engaged coaxially in a crank shaft 59 for advancement and retraction of the lever arm 57, the inter-engaged threaded joint of the adjustment rod 58 and crank shaft 59 being rotatably supported in the bearing 55 of the fixed supporting bracket arm 54, whereby, when the crank shaft 59 is rotated by the crank and handle 60, the saw-adjustment plate 56 is tilted on the pivot pin 53.

A saw shaft 61 is mounted through journals 62 transversely of the saw-platform portion 56a of the saw-adjustment plate 56, and manifestly with the pivotal movement of the adjustment plate, the angle of incline of the axis of the saw-shaft may be adjusted selectively in a vertical plane on the pivot pin 53. A downwardly curved guard arm 63 extends from the lower edge of the adjustment plate and is adapted at its free end to strike against the frame whereby the angular inclination of the shaft 61 is limited.

The saw-shaft 61 is rotated through pulley 50 at one of its ends and the opposite end of the shaft mounts a cutting blade, preferably a rotary saw 64, the cutting portion of the circumferential tooth edge of which rotates in adjacent closely spaced clearing relation to the adjacent edge portion of the conveyor flight 14a of the conveyor belt which carries the pockets 21. The blade may be raised and lowered relative to said edge portion by means of the central pivotal mounting of arm 42, and its position may be fixed by the jack screw 45. While the angle of the vertical plane of the saw blade relative to the plane of the conveyor belt may be adjusted by manipulation of the adjustment plate 56 through arm 57 and crank shaft 59 whereby the blade is at an angle greater than normal relative to the plane of the belt, it is also to be observed that due to the horizontal bias 42b the plane of the blade is not precisely parallel relative to the side edge of the belt, in that the plane of the saw blade is torqued or biased away from the belt at an acute angle to the vertical plane of the side edge of the belt in such a manner that its lead cutting portion 65 is spaced closer to the edge of the conveyor belt than its trailer edge portion 66. The purpose of the adjustability of the vertical plane of the blade is to adapt the cutting angle to normal relative to products to be trimmed wherein the trimable portion of the product is angular to the belt, such as products having heads of greater diameter than the end portions which are to be trimmed. The purpose of the horizontal torque or bias is to eliminate drag of the saw blade against the face of the severed end of the product during the cutting operation. This compound cant or incline of the shearing blade is best shown in Figs. 2 and 4.

From the foregoing description it will be noted that the shearing means 31 is a self-contained unit carried by the saw arm 42, the unit being mounted on and removable from the frame and also adjustable to position of operation, by means of the pivotal bearing shaft 43 which facilitates assembly operation and repair.

It is desirable with some products which have considerable variation of body diameter at opposite ends, such as bunched heads of broccoli, that means be provided for holding such product in the pockets 21 in the manner in which they have been arranged or positioned by the crowder belt. Such means are exemplified herein as consisting of a pair of longitudinally spaced spring fingers 67 and 68 overlying and spaced from the pockets 21, the finger 67 engaging the product in the pockets as the product is crowded by the crowder belt, and the finger 68 preferably having a lesser pressure value, engaging the product until it is delivered to the cutting edge of the saw for cutting.

Any conventional receptacle 69 may be provided closely underlying the saw to receive the material severed from the product by the saw, and a discharge chute 70 is provided at the end of the belt beyond the saw for the usual purpose of discharging the trimmed bunches into any suitable receptacle.

In operation the operators place the bunched broccoli transversely of the belt in the pockets 21, with the stem-end toward the cutting edge. Since the stems are of uneven length, the crowder flight of the crowder belt engages the opposite face of the heads of the bunches and moves the bunches transversely across the belt so that when they reach the saw all of the bunches have the same length overlying the belt with the surplus stem portions extending beyond the edge of the belt. Since the cutting portion at the lead edge of the saw rotates closely to the edge of the belt the surplus length of the stems is severed uniformly, the angular tilt of the vertical plane of the saw compensating for the incline of the axis of the bunched vegetables due to the fact that the head portion is of greater diameter than the stem portion. Thus, the stems are severed uniformly in length and substantially normal to the axis of the bunch. Since the trailing edge portion of the saw blade being spaced farther from the edge of the belt than the cutting edge portion, there is no frictional drag against the severed stems after the cutting thereof.

Having thus described the invention, what is claimed as new and patentable is:

1. Apparatus for trimming vegetables and the like having a driven conveyor belt having a conveyor face, a line of pockets longitudinally of said conveyor face of the belt for receiving the product to be trimmed, shearing blade means mounted adjacently to one side edge of the belt at an angle whereby the cutting portion of the blade edge is closer to the edge of the belt than the trailing edge portion of the blade, and crowder means at the opposite side portion of the belt adapted for pushing products in the pockets on the belt into shearable relation with the shearing means.

2. A vegetable trimming apparatus as set forth in claim 1 and in which the line of pockets are adjacent to the edge of the conveyor belt which is adjacent to the shearing means and the opposite side of the belt adjacent to the crowder means being free of said pockets.

3. A trimming apparatus of the character described, as set forth in claim 1, and in which there are elongated relatively spaced strips longitudinally underlying the conveyor flight of the belt for supporting the conveyor flight of the belt.

4. Apparatus for trimming vegetables and the like, as set forth in claim 1, the shearing means including a rotatable cutting blade, the vertical plane of said blade being positionable at an inclined angle greater than normal, relative to the horizontal plane of the belt.

5. A trimming apparatus as set forth in claim 1, and in which the shearing means includes a rotary cutting blade, the vertical plane of said blade being mounted for positioning at an inclined angle greater than normal relative to the horizontal plane of the belt, and at an acute angle relative to the vertical plane of the adjacent edge of the belt, the cutting portion of said blade being more nearly adjacent the belt and the incline of said angles being away from said edge of the belt.

6. A trimming apparatus of the character described as set forth in claim 1, the shearing means including a pivotally mounted arm, a bracket pivotally mounted on said arm, means to vertically adjust the angle of said bracket on the pivotal mounting, a blade shaft transversely of the bracket and adjustable therewith, a rotatable cutting blade mounted on said shaft, the cutting edge portion of which is more closely adjacent to a side edge of the belt than the trailing edge portion.

7. Apparatus for trimming vegetables and the like, comprising a driven conveyor belt having a line of pockets longitudinally of the conveyor face thereof for receiving the product to be trimmed, shearing means at one side edge of the belt including a rotatable cutting blade mounted for positioning at an inclined angle greater than normal relative to the horizontal plane of the belt and at an acute angle to the vertical plane of the adjacent side edge of the belt whereby the cutting portion of the blade is more nearly adjacent to the edge of the belt than the trailing portion of the blade, and means to vary the angle of vertical incline of the blade relative to said horizontal plane of the belt.

8. A trimming apparatus as set forth in claim 7, and including crowder means adjacent the opposite side edge of the belt adapted for pushing products on the belt into shearable relation with the shearing means, said crowder means having, in advance of the cutter portion of the blade, a portion inclined toward the longitudinal center line of the belt and a portion substantially parallel with said center line of the belt.

9. Vegetable trimming apparatus as set forth in claim 7 and in which there is a crowder means adjacent to the shearing means adapted for pushing products on the belt into shearable relation with the shearing means, said crowder means having, in advance of the cutter portion of the blade, a portion inclined toward the longitudinal center line of the belt and a portion substantially parallel with said center line of the belt.

10. A trimming apparatus as set forth in claim 7 and in which there is a crowder means adapted for pushing products on the belt into shearable relation with the shearing means, the crowder means including a driven crowder belt loop substantially normal to the horizontal plane of the conveyor belt, said crowder means having, in advance of the cutter portion of the blade, a portion inclined toward the longitudinal center line of the belt and a portion substantially parallel with said center line of the belt.

11. Vegetable trimming apparatus as set forth in claim 7 and which includes a crowder means adapted for pushing products on the belt into shearable relation with the shearing means, the crowder means including a driven crowder belt loop substantially normal to the horizontal plane of the conveyor belt and having a crowder flight overlying the plane of the conveyor belt, said crowder means having, in advance of the cutter portion of the blade, a portion inclined toward the longitudinal center line of the belt and a portion substantially parallel with said center line of the belt.

12. A trimming apparatus of the character described as set forth in claim 7 and in which there is a crowder means adapted for pushing products on the belt into shearable relation with the shearing means comprising a driven crowder belt loop substantially normal to the horizontal plane of the conveyor belt and having a crowder flight overlying the plane of the conveyor belt, and means for adjusting said overlying relation of the crowder belt relative to the conveyor belt, said crowder means having, in advance of the cutter portion of the blade, a portion inclined toward the longitudinal center line of the belt and a portion substantially parallel with said center line of the belt.

13. A vegetable trimming apparatus as set forth in claim 7 and which includes a driven crowder belt loop substantially normal to the horizontal plane of the conveyor belt adapted for pushing products on the belt into shearable relation with the shearing means, and having a crowder flight overlying the plane of the conveyor belt, means for adjusting the lengthwise tension of the crowder belt, and means for adjusting said overlying relation of the crowder belt relative to the conveyor belt, said crowder means having, in advance of the cutter portion of the blade, a portion inclined toward the longitudinal center line of the belt and a portion substantially parallel with said center line of the belt.

14. A trimming apparatus of the character described as set forth in claim 7 and in which there is a driven crowder belt loop substantially normal to the horizontal plane of the conveyor belt adapted for pushing products on the belt into shearable relation with the shearing means, and means driven by the conveyor belt for driving the crowder belt, said crowder means having, in advance of the cutter portion of the blade, a portion inclined toward the longitudinal center line of the belt and a portion substantially parallel with said center line of the belt.

References Cited in the file of this patent

UNITED STATES PATENTS

| | | |
|---|---|---|
| 1,257,719 | Low et al. | Feb. 26, 1918 |
| 1,875,072 | Maryott | Aug. 30, 1932 |
| 2,383,228 | Thompson et al. | Aug. 21, 1945 |
| 2,651,344 | Dufour | Sept. 8, 1953 |